United States Patent [19]

Gutowski

[11] 4,264,979
[45] Apr. 28, 1981

[54] DISPLAY DEVICE FOR CB RADIO

[76] Inventor: Karol Gutowski, 5231 Chadbourne Dr., Sterling Heights, Mich. 48077

[21] Appl. No.: 50

[22] Filed: Jan. 2, 1979

[51] Int. Cl.³ .......................... H04B 1/38; H03J 1/04
[52] U.S. Cl. ........................................ 455/77; 40/593;
40/901; 40/902; 116/263; 334/86; 340/97;
340/107; 340/110; 455/89; 455/90; 455/158;
455/345
[58] Field of Search ................... 340/870.08; 325/455,
325/25, 15, 16, 312, 391, 393; 334/86; 358/192,
192.1; 340/107, 110-112, 202, 87, 97, 330-332;
116/DIG. 29, 241, DIG. 30, 263, DIG. 31;
40/591-593, 455, 901, 902; 455/154, 158, 73,
77, 90, 89, 345, 352, 353

[56] References Cited

U.S. PATENT DOCUMENTS

| 3,678,457 | 7/1972 | Lev | 340/107 |
|---|---|---|---|
| 4,112,376 | 9/1978 | Fosnough et al. | 325/455 |
| 4,114,299 | 9/1978 | Brownlee | 40/591 |
| 4,157,531 | 6/1979 | Mont | 340/107 |

OTHER PUBLICATIONS

"Better CB: A Handfull and an 'Earful'"—Ivan Burger—Jan. 1977, Electronics, p. 89.

Primary Examiner—Marc E. Bookbinder
Attorney, Agent, or Firm—Cullen, Sloman, Cantor, Grauer, Scott & Rutherford

[57] ABSTRACT

A display panel for a CB transceiver is disclosed which identifies to others the channel being used by the operator and other information such as the operator's code name or that the operator needs emergency assistance. The display panel is adapted to be installed in a motor vehicle on the front dashboard, on the rear window area, or the side windows. In the preferred embodiment, the display panel includes an electronic digital channel indicator connected to the channel selector of the CB transceiver. The numbers displayed on the channel indicator change with the channel selected on the CB transceiver. A translucent overlay is mounted within the display panel in front of the digital channel indicator, and the overlay is personalized with information about the operator. A light behind the overlay makes the information visible to others. Two flashing lights are also mounted within the display panel. One of the lights is connected to the CB transceiver microphone to indicate that the operator is "on the air", and the other light is used in case the operator requires emergency assistance.

1 Claim, 3 Drawing Figures

DISPLAY DEVICE FOR CB RADIO

BACKGROUND OF THE INVENTION

The present invention relates generally to a display device for a mobile CB transceiver system and, more particularly, to a channel and information indicator for identifying to others the channel being used by the operator and other information such as the operator's code name or that the operator needs emergency assistance.

Many conventional radio receivers are provided with a microphone and the circuitry necessary to transmit a radio signal modulated with audio frequency information. Such radios are usually referred to as "citizens band", "CB", or "two-way radios" or, more generically "transceivers". For a number of years, such transceivers have been available in motor vehicles to enable the driver of the vehicle, while driving, to communicate with a person having a similar transceiver either at a stationary location or in another vehicle for information, entertainment, or emergency purposes.

Recently, the use of mobile transceivers has gained in popularity to a point where a large percentage of both cars and trucks on the road today are equipped with CB radios which has caused the airways to be flooded with communications. These CB radios are usually purchased separately and installed adjacent to or under the vehicle's dashboard and away from the steering wheel column where space is a little more plentiful and the transceiver cabinet will not significantly interfere with the driver's operation of steering, braking, accelerating, or other vehicle control functions. Such a location permits the driver to hear received radio messages and for messages he wishes to transmit, a microphone is attached to the transceiver by an electrical cord or cable of suitable length and the driver will normally steer the vehicle with one hand while he holds the microphone close to his mouth with the other hand so that he can transmit messages.

Until the present invention, CB radio users have not been able to display to others the channel they are using. A typical CB radio has 40 channels and an electronic digital channel indicator built into the transceiver or in the microphone. When an operator is on a particular channel, the channel number is displayed to him only. The channel number selected is not displayed to others, and therefore, the operator cannot always control to whom he is talking or listening. If one CB operator spots another automobile having a CB radio in traffic, it has not been possible for either CB operator to know if the other CB operator has his radio on or what channel is being used. Thus, there has been a need for a relatively simple, inexpensive, channel and information indicator for CB radios which can be quickly installed on existing transceivers or added as original equipment to new transceivers.

The disadvantages of present CB transceivers which do not have a channel indicator display device, for identifying the channel used, have resulted in the CB radio channel display of the present invention which effectively eliminates the difficulties hereinbefore discussed.

SUMMARY OF THE INVENTION

The display device for mobile citizen band transceiver systems of the present invention employs a display panel adapted to be installed in a motor vehicle on the front dashboard, on the rear window area, or the side windows so as to permit the identification to others of the CB radio channel being used and other information such as the operator's code name or that the operator needs emergency assistance.

In the preferred embodiment, the display panel contains within it a channel indicator which may be an electronic seven-segment digital display connected in parallel with the existing digital display of the CB radio. The numbers on the channel indicator change with the channel selected on the CB transceiver. Alternatively, a separate 40-position switch can be used for changing the electronic display to show the channel as selected on the CB radio. Thus, the electronic digital display indicator and display may be original equipment for CB radios by being connected directly to the radio channel selector or the display can have a separate selector switch controlling it for use in existing CB radios. In either arrangement, the electronic digital display is provided with a cut-out switch to turn off the digital display when its use is not desired.

The display panel has other features including a window face which holds a translucent overlay through which the electronic channel indicator can be seen. The overlay can be personalized to show the operator's code name and a light shown behind the name to make it visible to others. The display panel also includes two flashing lights behind the translucent overlay. One of the lights is connected to the CB radio microphone or a separate switch so as to indicate that the operator is "on the air" talking, and the other light is used in case the operator requires emergency assistance. If the operator desires others to switch to the channel he is on, the digital channel indicator may be made to pulsate or flash by switching a pulsator into the circuit.

Other advantages and meritorious features of the display panel of the present invention will be more fully understood from the following description of the preferred embodiment, the appended claims, and the drawings, a brief description of which follows.

DESCRIPTION OF THE PREFERRED EMBODIMENT

Figure 2:
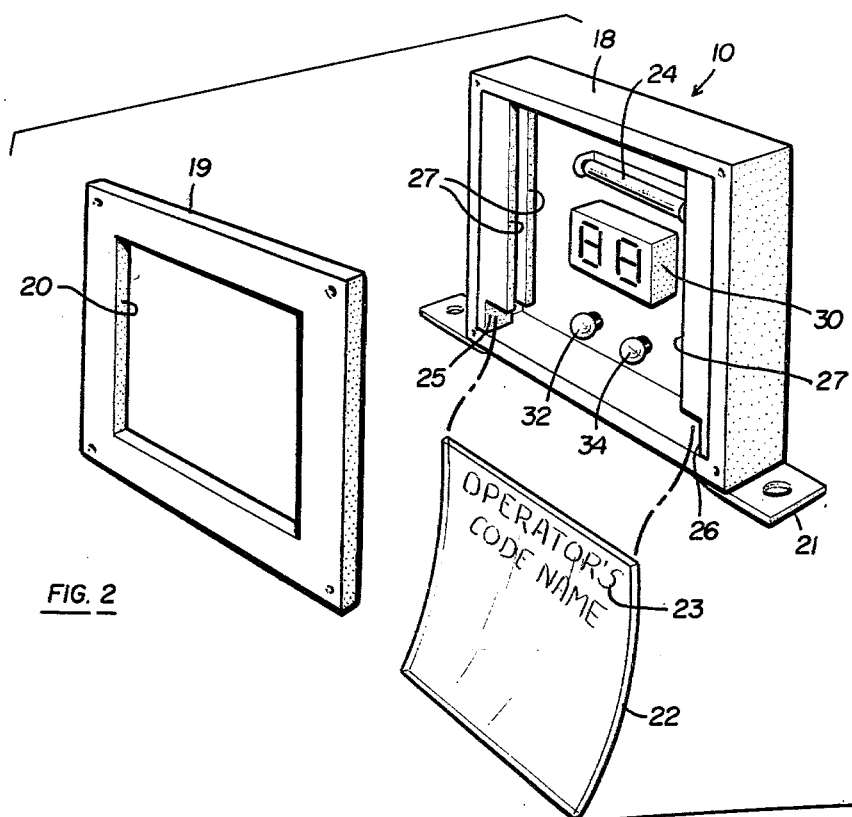
FIG. 2 is a partial perspective and assembly drawing illustrating the interior of the display panel.
Figure 1:
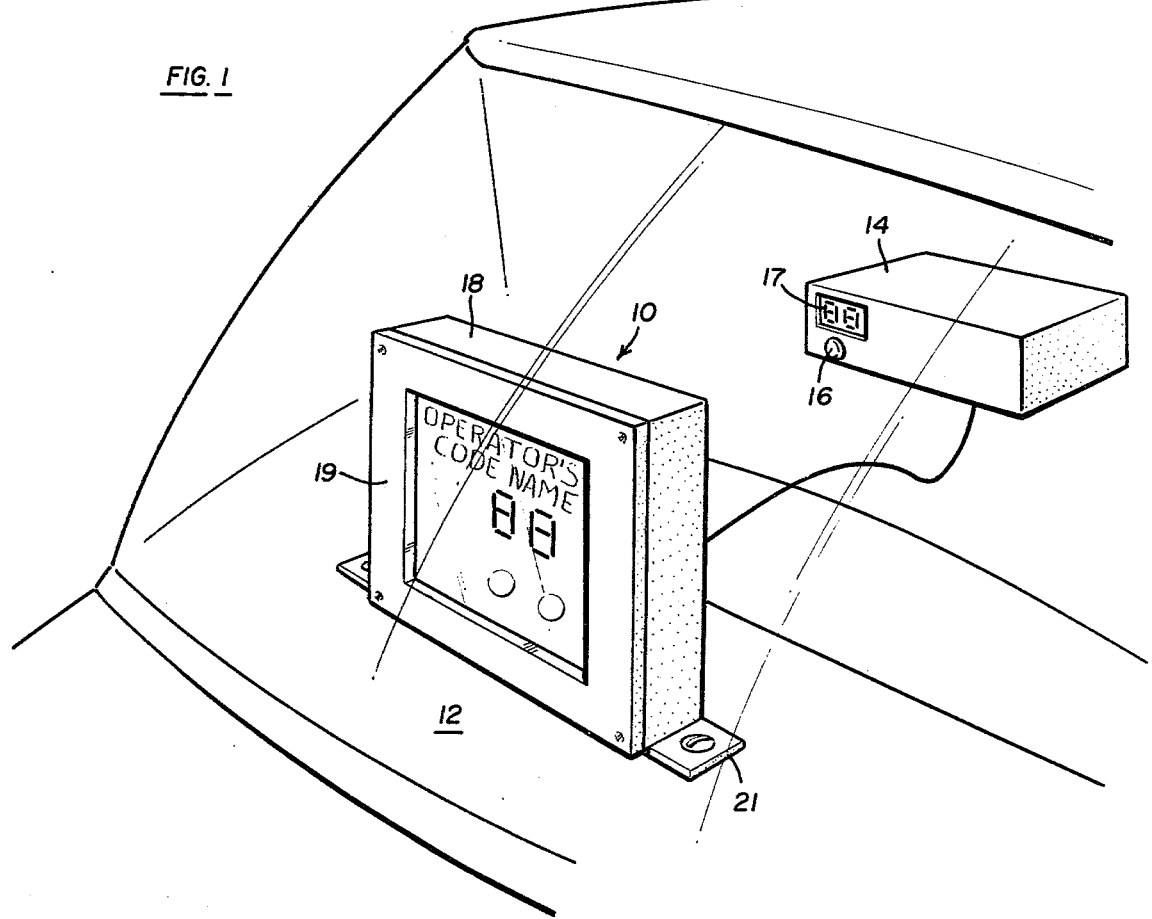
FIG. 1 is a partial perspective view illustrating the display panel of the present invention installed in the rear window area of a motor vehicle and connected to a CB transceiver.
Figure 3:
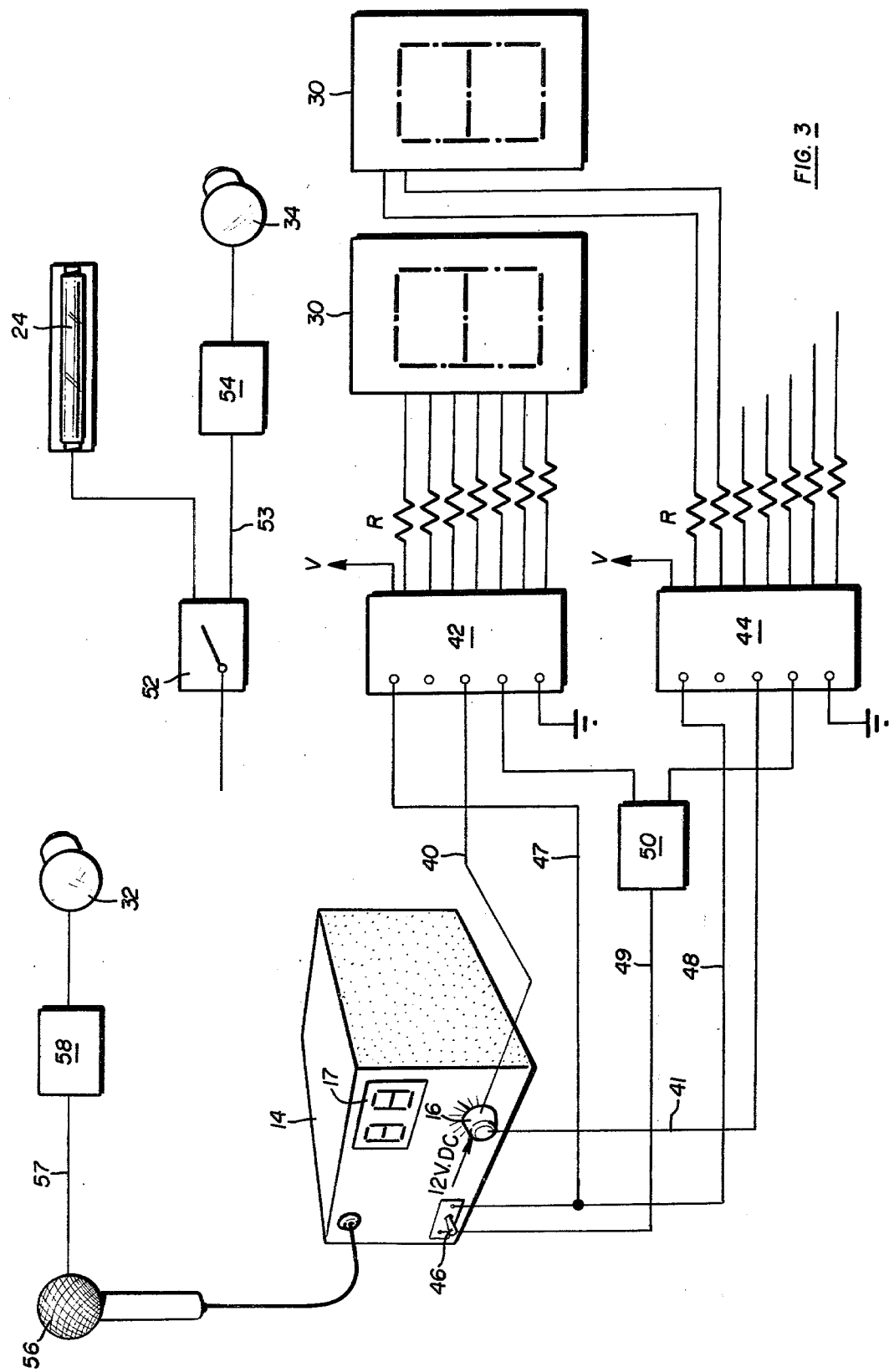
FIG. 3 is a general electrical schematic of the display panel connected to a CB transceiver.

A preferred embodiment of the CB channel and information display made in accordance with the teachings of the present invention is illustrated in FIGS. 1–3. The display 10 may be installed in a motor vehicle on the front dashboard, the side windows, or as illustrated in the rear window area 12. The display 10 is connected to a CB transceiver 14 having a channel selector 16 and an electronic digital display 17. The display 10 identifies to others the CB radio channel being used and other information such as the operator's code name or that the operator needs emergency assistance.

The display cabinet 10 includes a rectangular frame 18 covered with a removable cover panel 19. Panel 19 has a window opening 20 through which the displayed information may be seen. Suitable support legs 21 are secured to the frame for mounting the frame to any desired surface.

The display includes a translucent overlay 22 which can be personalized to show, for example, the operator's code name 23. Other information may also be put onto the overlay. A display light 24 mounted in the cabinet 10 behind the overlay makes the name visible to others. Within frame 10 are vertically arranged inner side wall members 25 and 26, each having inwardly extending edge flanges 27 formed along their vertical edges starting a short distance from the bottom of the frame. Thus, the inner side wall members and edge flanges form tracks which securely hold the overlay 22 within the cabinet 10.

An electronic, seven-segment digital, channel indicator 30 including two-digit readout is mounted in the display 10 to indicate the channel selected on channel selector 16 of CB radio 14. The electronic channel indicator 30 is connected in parallel with the existing digital display 17 in the CB radio. The numbers on the electronic channel indicator 30 change with the channel selected on the CB transceiver. Alternatively, a separate 40-position switch can be used for changing the electronic channel indicator to show the channel selected on the transceiver. Thus, the electronic channel indicator 30 may be original equipment for the CB radio by being connected directly to the radio channel selector or the channel indicator can have a separate switch controlling it for use in exsiting CB radios.

Two flashing lights 32 and 34 are also mounted within the display panel 10. Light 32 is connected to the CB radio microphone or a separate switch so as to indicate that the operator is "on the air" talking. The other flashing light 34 which may be colored is only used in cases of emergency when the operator desires to be contacted for assistance.

The operation of the display panel 10 will be best illustrated by reference to FIG. 3. In the preferred embodiment, the channel indicator 30 which is a seven-segment digital display, is put in parallel with the existing digital display 17 of the CB transceiver 14. Thus, the channel number selected by the operator on channel selector 16 is both displayed on the transceiver display 17 and the channel indicator display 30. The numbers on the channel indicator 30 change with the channel selected on the channel selector 16. Alternatively, for existing CB transceivers, a separate 40-position switch (not shown) can be used for changing the elcectronic display 30 to show the channel as selected.

The channel selector 16 of the CB transceiver is connected to the seven-segment digital display of channel indicator 30 through input lines 40 and 41 to decimal to digital converters 42 and 44. Converters 42 and 44 are of the same type used for the digital display 17 in the CB transceiver. The converters are, in turn, connected to the seven-segment display through resistances R such that as the channel selector 16 is changed, the channel number selected is displayed by channel indicator 30.

The CB transceiver 14 is provided with a three-position switch 46 which serves two functions. If it is desired to cut-out or turn off the digital display 30, the switch 46 is moved to the right and, through inputs 47 and 48, the display 30 is simply disconnected from the channel selector 60. When the operator desired others to switch to the channel he is on, switch 46 is moved to the left and input 49 which passes through conventional pulsator or breaker 50 causes the digits displayed by the channel indicator 30 to flash. Thus, a steady number on display 30 indicates that the operator is listening, and a flashing number indicates that the operator wants to talk with the person to whom the number is displayed. It is within the scope of the present invention that the three-position switch 46 be separate from the CB transceiver so that the display 10 can be made an add-on to existing CB transceivers.

The display panel 10 has other features including the translucent overlay 22 which is personalized to show the operator's code name or other information. To illuminate the code name or whatever information appears on the overlay, a light 24 behind the overlay is turned on to make the information visible outside the automobile. A switch 52 is used to turn the lamp 24 on or off. Switch 52 also has an emergency position through input 53 and pulsator or breaker 54 to flash emergency light 34 if the operator requires emergency assistance. Another person seeing flashing light 34 can switch to the channel number displayed on the channel indicator 30 and thereby communicate and provide assistance to the distressed operator.

The microphone 56 of the CB transceiver 14 is connected through input 57 and pulsator 58 to flashing light 32. Line 57 is connected to the microphone's jack within the transceiver. A separate switch may also be used and is within the scope of the present invention. Thus, when the operator goes "on the air" to talk, light 32 begins to flash.

The present invention provides the operator with an ability to communicate with others passing by which was not possible previously except by accident. The operator can switch to a channel for listening, and the channel number displayed on channel indicator 30 will be steady. If the operator wants to have someone come on the channel for talking, he positions switch 46 to cause the channel number displayed to pulsate. Once the operator is "on the air" talking, flashing light 32 indicates to others the fact that the operator is talking and display 30 indicates the channel is being used. For emergencies, the flashing light 34 indicates that there is an emergency, and the channel number displayed indicates on which channel the operator may be reached.

It will be apparent to those skilled in the art that the foregoing disclosure is exemplary in nature rather than limiting, the invention being limited only by the appended claims.

I claim:

1. A display panel for a CB transceiver, said CB transceiver being mounted withn an automobile and having a channel selector, a digital display, and a microphone, said display panel identifying to others the channel number being used by an operator of said CB transceiver and other information, said display panel comprising:
   a frame covered by a removable cover panel, said cover panel having a window opening;
   support legs secured to said frame for mounting said frame near a window area of said automobile so that said display panel may be viewed by others outside said automobile;
   said frame including vertically arranged inner side wall members, each side wall member having plural inwardly extending flanges formed along their vertical edges defining tracks which securely hold a translucent overlay within said frame, said overlay being partially covered by said removable cover panel, said overlay including personalized information about the operator;

an electronic digital channel indicator mounted in said frame and visible through said overlay, said digital indicator connected to said CB transceiver channel selector and being normally activated to display the channel number selected by said operator on said channel selector;

a first light mounted in said frame, said light connected to said CB transceiver microphone, first pulsating means for causing said first light to flash when said microphone is activated for use by the operator; and first switch means mounted in said CB transceiver, in a first position said switch means turning off said normally activated digital channel indicator in said display panel and in a second position said switch actuating second pulsating means for causing said digital indicator to flash indicating that the operator desires to be contacted on the channel number displayed;

and a second light being mounted in said frame behind said overlay to illuminate said personalized information for viewing by others, a third light being mounted within said frame and second switch means connected to said second and third lights, said second switch means selectively actuating third pulsating means for causing said third light to flash when said operator requires emergency assistance or said second switch means actuating said second light when it is desired to illuminate said personalized information.

* * * * *